United States Patent [19]

Munakata et al.

[11] Patent Number: 5,449,660
[45] Date of Patent: Sep. 12, 1995

[54] METHOD OF PRODUCING COMPOUND OXIDE BY USING PARTLY CITRATING PROCESS

[75] Inventors: Fumio Munakata, Tokyo; Mitsugu Yamanaka; Susumu Hiyama, both of Kanagawa, all of Japan

[73] Assignees: Nissan Motor Co., Ltd., Yokohama; Seimi Chemical Company, Limited, Chigasaki, both of Japan

[21] Appl. No.: 31,926

[22] Filed: Mar. 16, 1993

Related U.S. Application Data

[63] Continuation of Ser. No. 656,724, Feb. 19, 1991, abandoned.

[30] Foreign Application Priority Data

Mar. 6, 1990 [JP] Japan ................... 2-52589

[51] Int. Cl.$^6$ ................... H01B 12/00; H01L 39/12
[52] U.S. Cl. ................... 505/441; 505/100; 505/734; 505/737; 505/738; 423/593; 423/430; 423/87; 423/420.2; 252/518; 252/521
[58] Field of Search ............ 505/100, 734, 737, 725, 505/738; 423/593, 419 R, 419 P, 430, 87; 252/518, 521

[56] References Cited

U.S. PATENT DOCUMENTS

| | | | |
|---|---|---|---|
| 4,859,652 | 8/1989 | Block | 505/1 |
| 4,897,378 | 1/1990 | Chiang | 505/1 |
| 4,994,433 | 2/1991 | Chiang | 505/1 |
| 5,039,654 | 8/1991 | Mizuta | 505/1 |
| 5,066,636 | 11/1991 | Liu | 505/1 |
| 5,168,095 | 12/1992 | Munakata | 505/1 |

OTHER PUBLICATIONS

Materials Resource Symp. Proc. vol. 99 pp. 49–55, 1988 Barboux, P. et al.
Trolier et al American Ceramic Soc. Bull 67[4] 759–62 1988.
Japanese Journal Applied Physics, Enomoto et al V 28(7) Jul. 1989.
Marcilly et al Journal of American Ceramic Society, *Preparation of Highly Dispersed Mixed Oxides and Oxide Solic Solutions* . . . 53(1): 56–57 (1970).

*Primary Examiner*—Paul Lieberman
*Assistant Examiner*—M. Kopec
*Attorney, Agent, or Firm*—Foley & Lardner

[57] ABSTRACT

A method of producing a compound oxide of elements including at least one of thallium, bismuth, lead, antimony, yttrium, each of rare earth elements, each of transition metal elements, each of alkali metal elements and each of alkaline earth metal elements. The method is comprised of the steps of (i) reacting at least one of carbonate, basic carbonate, hydroxide and co-precipitates of each of the above-mentioned elements with an amount of citric acid that is less than the weight equivalent of citric acid needed to form a completely citrated compound, and (ii) calcining the partly citrated compound. The co-precipitate can be one of a carbonate, a basic carbonate and a hydroxide of each of the above-mentioned elements.

13 Claims, 10 Drawing Sheets

METHOD OF PRODUCING COMPOUND OXIDE BY USING PARTLY CITRATING PROCESS

This application is a continuation, of application Ser. No. 07/656,724, filed Feb. 19, 1991, now abandoned.

BACKGROUND OF THE INVENTION

1. Field of the Invention

This invention relates to improvements in a method of producing a compound oxide by using a citrating process for compounds of elements, and more particularly to the method of producing the compound oxide by partly citrating the compounds of elements.

2. Description of the Prior Art

Hitherto a variety of methods of producing a compound oxide by using the citrating process for compounds of elements have been carried out in order to prepare raw materials of functional ceramics such as magnetic substances, catalysts, sensors, high temperature superconductors, dielectrics, and photoactive materials. One of such methods is disclosed by C. Marcilly in Journal of American Ceramic Society 53, 56 (1970). In this method, the compound oxide is synthesized under reaction of citrate with nitrate and acetate of metals. Another method is disclosed by Hirabayashi et al in the Bulletin of Japan Metallurgical Society 26, 10 (1987). In this method, citric acid and ethylene glycol are reacted with nitrates of yttrium, barium and copper thereby to synthesize a high temperature superconductive compound oxide.

However, in the above methods, citric acid is added to aqueous solution of nitrate and/or acetate of metallic elements so as to be dissolved, in which citric acid merely coexists with the metallic nitrate and/or metallic acetate in the aqueous solution. Accordingly, no citrate has been produced in the aqueous solution. Citrate is produced for the first time when the aqueous solution is heated to be concentrated and dehydrated. During this heating process, a large amount of harmful gases such as nitric acid ($HNO_3$) gas, nitrogen oxides (NOx) gas, and acetic acid ($CH_3COOH$) gas are evolved. Furthermore, after the dehydration, the citrate is gelled and strongly adhered to a container. Thus the citrate is sticky and difficult to be treated. Additionally, during calcination, the citrate becomes into an oil state and will vigorously burn with black smoke, which is very dangerous. The thus calcined citrate is in a ceramel state and therefore tends to swell so as to be very difficult to be treated. Moreover, although the above-discussed methods can be carried out in an experimental scale, they are difficult to be carried out in an industrial scale because of raising many problems from view points of environmental pollution and producing devices.

SUMMARY OF THE INVENTION

It is an object of the present invention to provide an improved producing method of a compound oxide by using a citrating process, by which drawbacks encountered in conventional same producing methods can be overcome.

Another object of the present invention is to provide an improved producing method of a compound oxide by using a citrating process, by which a homogenous and high quality compound oxide can be industrially mass-produced without raising problems in environmental pollution and production process.

A method of the present invention is for producing a compound oxide of elements including at least one selected from the group consisting of thallium, bismuth, lead, antimony, yttrium, each of rare earth elements, each of transition metal elements, each of alkali metal elements, and each of alkaline earth metal elements. The method is comprised of the following steps in the sequence set forth: (1) partly reacting at least one selected from the group consisting of carbonate, basic carbonate, hydroxide and co-precipitate of each of the elements with citric acid to form a partly citrated compound, the co-precipitate being one selected from the group consisting of carbonate, basic carbonate and hydroxide; (2) and calcining the partly citrated compound.

According to this method, by virtue of the partial reaction of the carbonate, the basic carbonate, the hydroxide and the co-precipitate with the citric acid, slurry containing the partly citrated compound in the state of fine particles are formed. The slurry is formed of only the partly citrated compound and water. Accordingly, fine powder of the partly citrated compound can be obtained without impurities. Thus, powder of the compound oxide can be obtained without generating harmful gases such as $HNO_3$, NOx, $CH_3COOH$ and/or the like during the calcination process. This makes possible industrial mass production of the compound oxide powder without raising problems in environmental pollution and producing devices.

DETAILED DESCRIPTION OF THE INVENTION

According to the present invention, there is provided a method of producing a compound oxide of elements including at least one of thallium, bismuth, lead, antimony, yttrium, each of rare earth elements, each of transition metal elements, each of alkali metal elements and each of alkaline earth elements. The method comprises the following steps in the sequence set forth: (1) At least one of carbonate, basic carbonate, hydroxide and co-precipitate of each of the elements is partly reacted with citric acid to form a partly citrated compound, in which the co-precipitate is one of carbonate, basic carbonate and hydroxide; and (2) The partly citrated compound is calcined.

Examples of the rare earth elements are lanthanum (La), neodymium (Nd), gadolinium (Gd), holmium (Ho) and erbium (Er). Examples of the transition metal elements are copper (Cu), nickel (Ni), cobalt (Co), manganese (Mn) and iron (Fe). Examples of alkali metal elements are patassium (K) and sodium (Na). Examples of alkaline earth metals 20 are barium (Ba), strontium (Sr), calcium (Ca) and magenesium (Mg).

In the method of the present invention, in order to accomplish the synthesizing reaction to form the partly citrated compound, an amount of the citric acid to be reacted with the above-mentioned at least one of the carbonate, the basic carbonate, the hydroxide and the co-precipitate is preferably within 25 to 90% by weight, more preferably 30 to 50% by weight, of an equivalent amount of the same required to form citrate. The synthesizing reaction is carried out preferably at a temperature ranging from 40° to 120° C., more preferably at a temperature of 80°±5° C.

After formation of the partly citrated compound, the compound is dried preferably at a temperature ranging from 50° to 130 ° C., more preferably at a temperature of 110°±5 ° C. After drying the partly citrated compound, the dried compound is provisionally calcined at a temperature ranging from 800° to 900° C. for a time not less than 4 hours. Then, the thus provisionally calcined compound is further calcined at a temperature ranging from 850 to 1000° C. This further calcination is carried out for a time not less than 30 hours in case of producing the compound oxide (superconductor powder) of a bismuth-based system, in which superconductivity at 110K is exhibited.

According to the present invention, the partial reaction of the carbonate, the basic carbonate, the hydroxide and the co-precipitate with the citric acid provides slurry containing the partly citrated compound in the state of fine particles. The slurry is formed only of the partly citrated compound and water, so that fine powder of the partly citrated compound without impurities can be formed. Thus, powder of the compound oxide can be finally obtained without generating harmful gases such as $HNO_3$, $NO_x$, $CH_3COOH$ and/or the like during the calcination. This makes possible industrial mass production of the compound oxide powder.

Additionally, it has been experimentally confirmed that the resultant calcined partly citrated compound provides the compound oxide having a very homogeneous structure. Such a compound oxide serves as a high temperature superconductor and therefore exhibits a transition temperature $T_c$ of 110K in case of a bismuth-based system (in which a major component element is bismuth) and 123 K in case of a thallium-based system (in which a major component element is thallium), providing a very high Meissner effect.

Thus, the compound oxide production method of the present invention using the partly citrating process is very effective in industrial mass production as compared with conventional compound oxide production methods using a process of adding citrate to nitrate and/or acetate.

In order to evaluate the compound oxide produced according to the present invention, Examples 1 to 6 (Sample Nos. 1 to 6) of the present invention will be discussed in comparison with Comparative Examples 1 to 3 (Sample Nos. 7 to 9) not within the scope of the present invention.

EXAMPLE 1

Mixing was made for 40.69 g of basic bismuth carbonate (corresponding to 90.25 wt % as $Bi_2O_3$), 10.53 g of basic lead carbonate (corresponding to 83.25 wt % as PbO), 29.28 g of strontium carbonate (corresponding to 70.30 wt % as SrO), 19.65 g of calcium carbonate (corresponding to 55.62 wt % as CaO) and 33.51 g of basic copper carbonate (corresponding to 69.78 wt % as CuO). The thus obtained mixed compounds were pulverized by an atomizer and then further mixed to obtain a mixture. The mixture in amount of 100.0 g was mixed with 30.80 g (33 wt % of equivalent amount) of citric acid and 400 g of water. The thus obtained mixture was reacted at 80°±5° C., thereby providing slurry.

After completion of the reaction, the obtained slurry was dried at 110° C. and dehydrated thereby forming 105.8 g of the partly citrated compound. The thus obtained partly citrated compound was preliminary calcined at 800° C. for 6 hours and thereafter gradually cooled to form 77 g of the preliminary calcined product. The preliminary calcined product was pulverized by using an agate mortar or a ball mill. The calcined product in an amount of 2 to 2.5 g was pressed at a pressure of 100 to 200 Kg/cm to form a compacted product having a diameter of 20 mm and a thickness of 1 to 2 mm. The compacted product was then further calcined at 850° C. for 60 hours to obtain a pellet of the compound oxide.

EXAMPLE 2

$Bi(NO_3)_2.5H_2O$ in an amount of 38.81 g (0.08 mol), $Pb(NO_3)_2$ in an amount of 6.62 g (0.02 mol), $Sr(NO_3)_2$ in an amount of 21.16 g (0.1 mol), $Ca(NO_3)_2.4H_2O$ in an amount of 23.62 g (0.1 mol), $Cu(NO_3)_2.3H_2O$ in an amount of 36.24 g (0.15 mol) were dissolved in 400 g of water to obtain an aqueous solution. Then, 312 ml (62.1 g or 0.45 mol as $K_2CO_3$) of $K_2CO_3$ 20% (w/v) was dropped little by little into the aqueous solution thereby causing co-precipitation to obtain co-precipitate of carbonate of Bi, Pb, Sr, Ca and Cu. The thus obtained co-precipitate was rinsed with water and dried at 80° C. thus obtaining 74 g of the dried co-precipitate.

The dried co-precipitate was mixed with 21 g (33 wt % of the equivalent amount) of citric acid and 300 g of pure water and reacted with each other at 80°±5° C. to form slurry. After completion of the reaction, the slurry was dehydrated at 110° C. to obtain 95.2 g of the partly citrated compound.

Thereafter, the thus obtained partly citrated compound was treated as same as that in Example 1 to finally form a pellet of the compound oxide.

EXAMPLE 3

Mixing was made for 41.69 g of basic bismuth carbonate (corresponding to 90.25 wt % as $Bi_2O_3$), 5.38 g of basic lead carbonate (corresponding to 83.25 wt % as PbO), 2.97 g of antimony hydroxide (corresponding to 97.6 wt % as $Sb_2O_3$), 29.34 g of strontium carbonate (corresponding to 70.30 wt % as SrO), 19.95 g of calcium carbonate (corresponding to 55.97 wt % as CaO) and 34.04 g of basic copper carbonate (corresponding to 69.78 wt % as CuO). The thus obtained mixed compounds were pulverized and well mixed for 3 hours by using a ball mill (having a content volume of 900 ml and formed of nylon) thereby to obtain a mixture. The mixture in an amount of 100.0 g was mixed with 41.0 g (44 wt % of the equivalent amount) of citric 20 acid and 300 g of water and then reacted with each other at 80°±5° C. to form slurry.

After completion of the reaction, the thus obtained slurry was dried and dehydrated at 110° C. to obtaining 108.7 g of the partly citrated compound.

Thereafter, the thus obtained partly citrated compound was treated as same as that in Example 1 to finally form a pellet of the compound oxide.

EXAMPLE 4

Pulverizing and mixing was made for thallium carbonate in an amount of 45.06 g (corresponding to 89.20 wt % as $Tl_2O_3$), Barium carbonate in an amount of 35.57 (corresponding to 77.37 wt % as BaO), calcium carbonate in an amount of 17.99 g (corresponding to 55.97 wt % as CaO) and basic copper carbonate in an amount of 30.69 g (corresponding to 69.78 wt % as CuO) by using an atomizer, thereby obtaining a mixture. 100.0 g of the thus obtained mixture was mixed with 32.0 g (28 wt % of the equivalent amount) and 400 g of water, and then reacted with each other at 80°±5° C. thus obtaining slurry.

After completion of the reaction, the obtained slurry was dried and dehydrated thereby to form 113.2 g of the partly citrated compound.

Thereafter, the thus formed partly citrated compound was treated as same as that in Example 1 to finally form a pellet of the compound oxide.

EXAMPLE 5

Pulverizing and mixing was made for thallium carbonate in an amount of 41.35 g (corresponding to 89.20 wt % as $Tl_2O_3$), basic lead carbonate in an amount of 10.68 g (corresponding to 83.25 wt % as PbO), barium carbonate in an amount of 39.64 g (corresponding to 77.37 wt % as BaO), calcium carbonate in an amount of 20.04 g (corresponding to 55.97 wt % as CaO) and basic copper carbonate in an amount of 34.04 g (corresponding to 69.78 wt % as CuO) by using an atomizer, thereby obtaining a mixture. The mixture in an amount of 100.0 g was mixed with 30.0 g of citric acid and 600 g of water, and then reacted with each other at 80°±5° C. to form slurry.

After completion of the reaction, the thus formed slurry was dried and dehydrated at 110° C. thereby to obtain 110.29 g of the partly citrated compound.

Thereafter, the resultant partly citrated compound was treated the same as that in Example 1 to finally form a pellet of the compound oxide.

EXAMPLE 6

The same procedure was carried out as that in Example 1 with the exception that the amount of citric acid was 93.5 g (equivalent amount to whole metallic ions). As a result, 165.8 g of citrated compound was formed to finally obtain a pellet of the compound oxide.

COMPARATIVE EXAMPLE 1

$Bi(NO_3)_2.5H_2O$ in an amount of 19.41 g (0.04 mol), $Pb(NO_3)_2$ in an amount of 3.31 g (0.01 mol), $Sr(NO_3)_2$ in an amount of 10.58 g (0.05 mol), $Ca(NO_3)_2.4H_2O$ in an amount of 11.81 g (0.05 mol) and $Cu(NO_3)_2.3H_2O$ in an amount of 18.12 g (0.075 mol) were dissolved in 200 ml of water to obtain an aqueous solution. Citric acid in an amount of 34.3 g (0.163 mol) was added to the aqueous solution and well stirred to form a solution. The thus formed solution was evaporated to be dehydrated and concentrated on a hot plate. During this evaporation, NOx (about 36 g or 0.8 mol as $NO_2$) was generated in addition to $H_2O$, forming a gelled citrated compound or citrate. When the gelled citrated compound was further dehydrated, it finally came into a caramel state and therefore adhered to a container. The adhered citrated compound was scratched off from the container and pulverized. The citrated compound was thereafter provisionally calcined at 800° C. for 6 hours, followed by a gradual cooling. As a result, 25.8 g of a provisionally calcined product was obtained because a considerable amount of the citrated compound remained unremoved in the container and the like.

Thereafter, the thus obtained provisionally calcined product was treated the same as that in Example 1 thereby finally forming a pellet of the compound oxide.

COMPARATIVE EXAMPLE 2

Pulverizing and mixing was made for 6 hours for bismuth oxide in an amount of 36.91 g (corresponding to 99.5 wt % as $Bi_2O_3$), lead oxide in an amount of 8.80 g (corresponding to 99.6 wt % as PbO), strontium carbonate in an amount of 29.28 (corresponding to 70.30 wt % as SrO), calcium carbonate in an amount of 19.65 (corresponding to 55.62 wt % as CaO) and copper oxide in an amount of 23.48 (corresponding to 99.6 wt % as CuO) thereby obtaining 85 g of a mixture. The mixture was provisionally calcined at 800° C. for 10 hours and then gradually cooled thereby forming a provisionally calcined product.

Thereafter, the thus formed provisionally calcined product was treated the same as that in Example 1, thus finally obtaining a pellet of the compound oxide.

COMPARATIVE EXAMPLE 3

The provisionally calcined product in an amount of 30 g, formed in Comparative Example 2 was further pulverized for 6 hours by using a ball mill to form a pulverized product. The pulverized product was subjected to a further provisional calcination at 800° C. for 10 hours.

Thereafter, the provisionally calcined product was treated the same as that in Example 1 thus finally obtaining a pellet of the compound oxide.

EXPERIMENT

Figure 1:
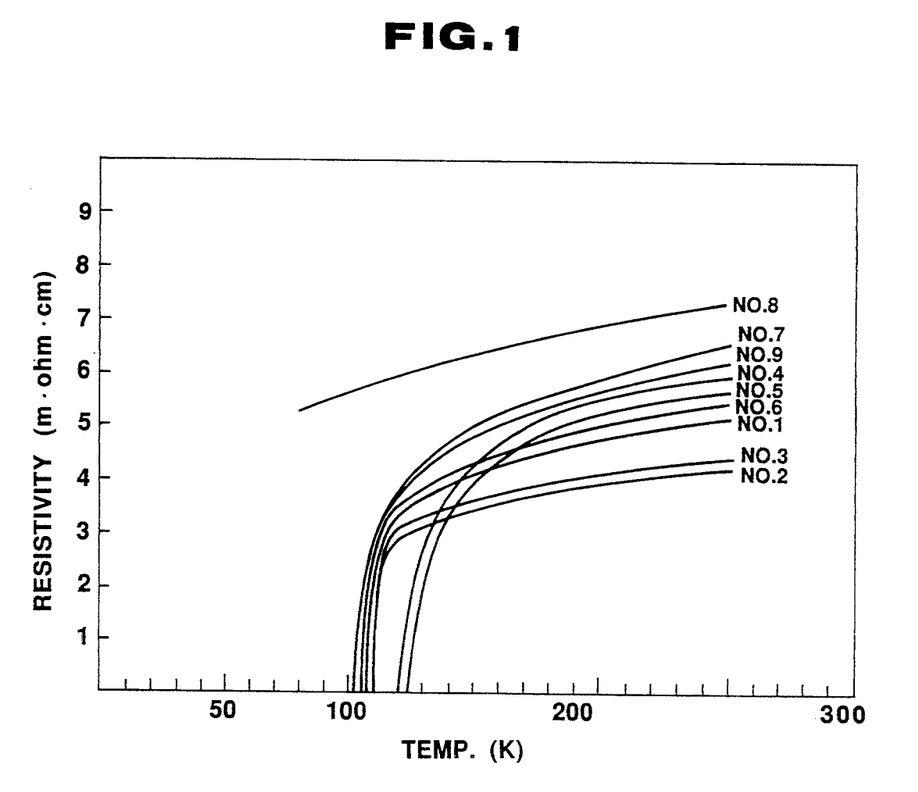
FIG. 1 is a graph showing the relationship between temperature (K) and resistivity, illustrating the transition temperature Tc of each of compound oxides obtained by Examples and Comparative Examples.
Figure 2A:
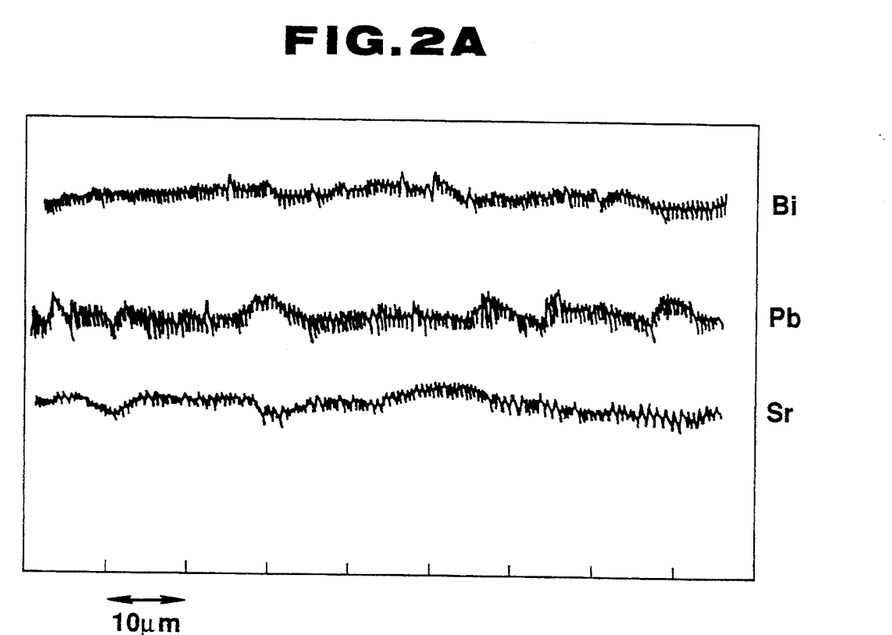
FIG. 2A is a graph showing the result of an EPMA analysis for Bi, Pb, Sr of the compound oxide obtained by the Example 1.
Figure 2B:
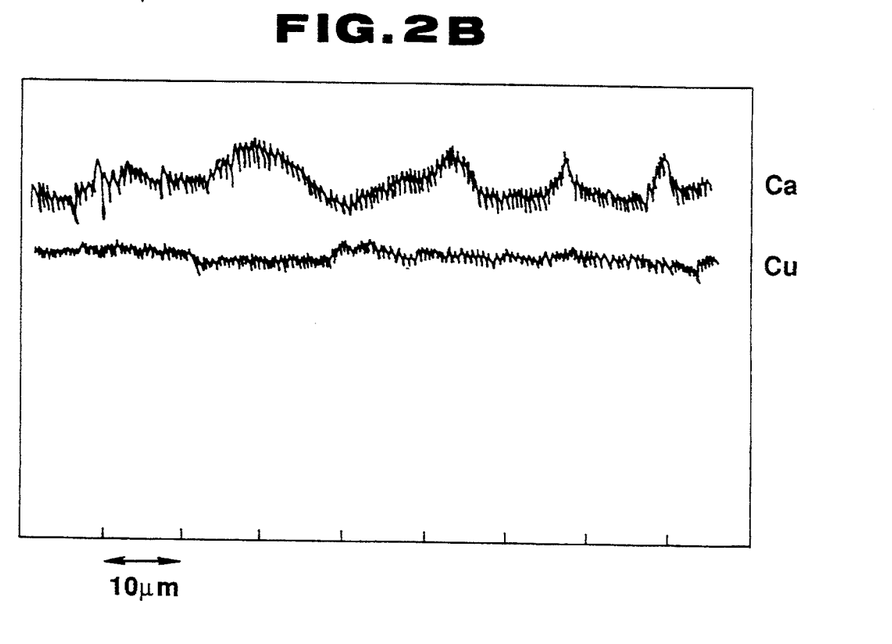
FIG. 2B is a graph showing the result of a EPMA analysis for Ca and Cu of the compound oxide obtained by the Example 1.
Figure 3A:
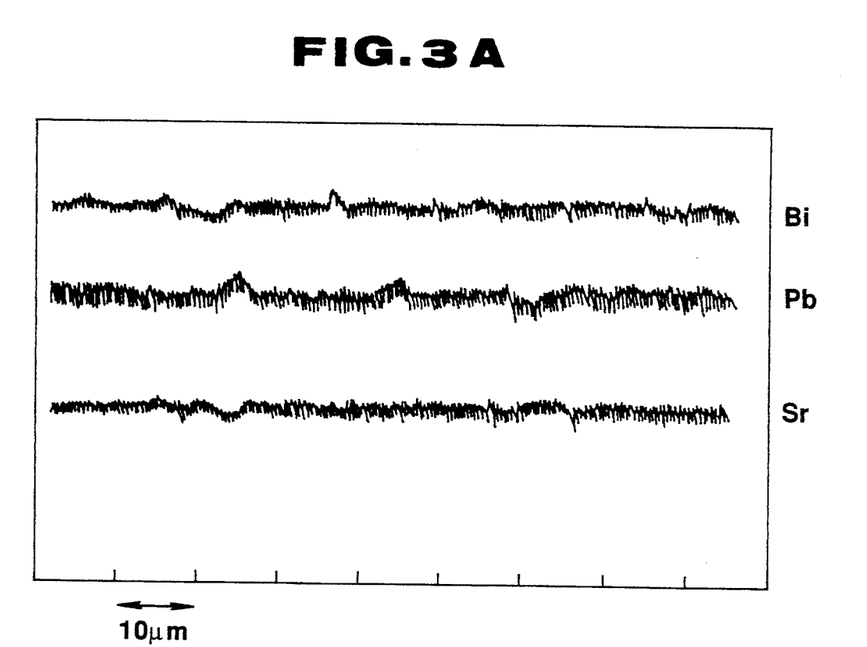
FIG. 3A is a graph similar to FIG. 2A but showing the EPMA analysis result for Bi, Pb and Sr of the compound oxide obtained by the Example 2.
Figure 3B:
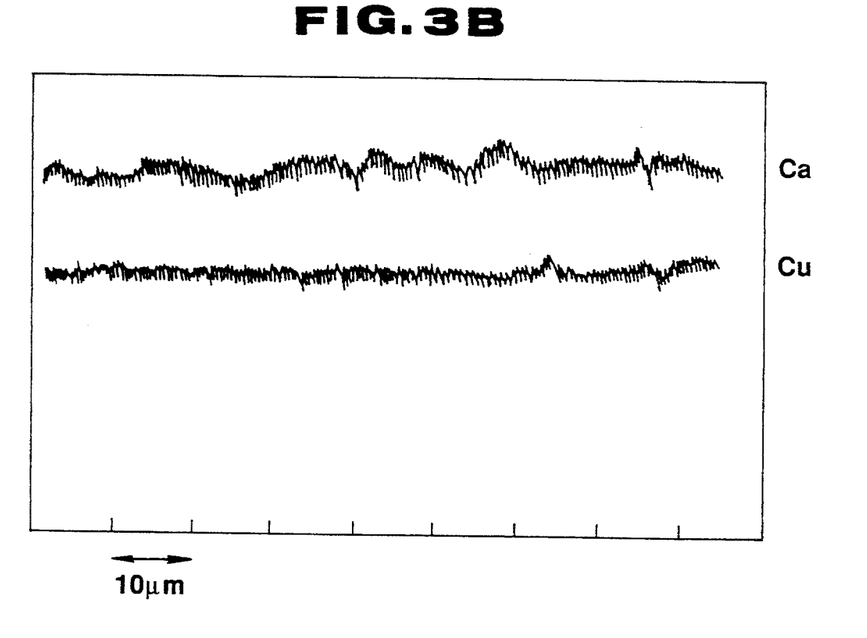
FIG. 3B is a graph similar to FIG. 2B but showing the EPMA analysis for Ca and Cu of the compound oxide obtained by the Example 2.
Figure 4A:
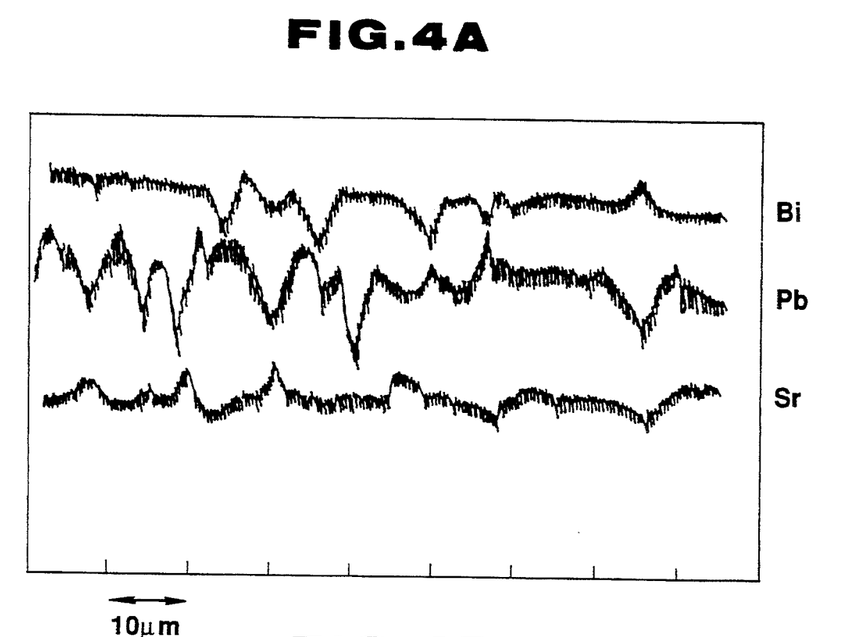
FIG. 4A is a graph similar to 2A but showing the EPMA analysis result for Bi, Pb and Sr of the compound oxide obtained by Comparative Example 1.
Figure 4B:
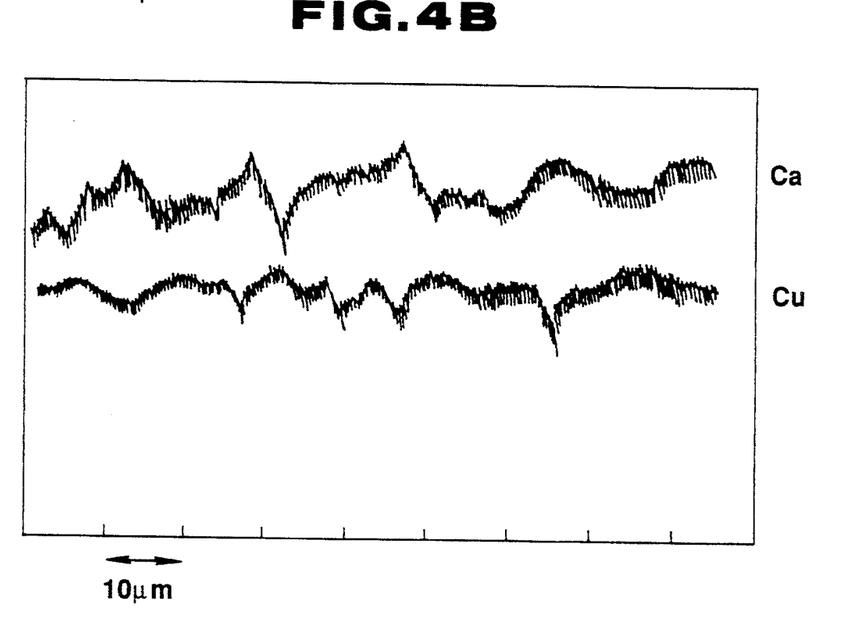
FIG. 4B is a graph similar to 2B but showing the EPMA analysis result for Ca and Cu of the compound oxide obtained by Comparative Example 1.
Figure 5A:
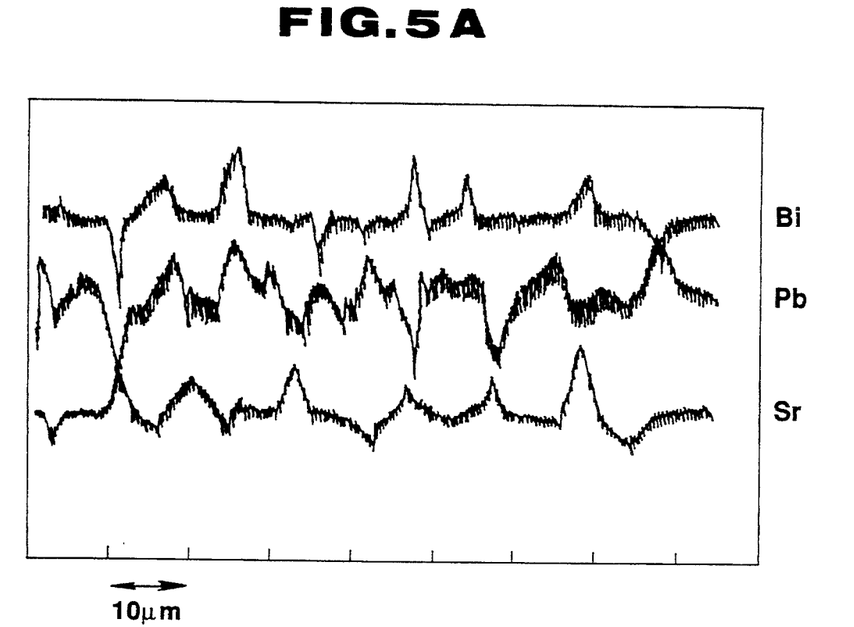
FIG. 5A is a graph similar to FIG. 2A but showing the EPMA analysis result for Bi, Pb and Sr of the compound oxide obtained by Comparative Example 2.
Figure 5B:
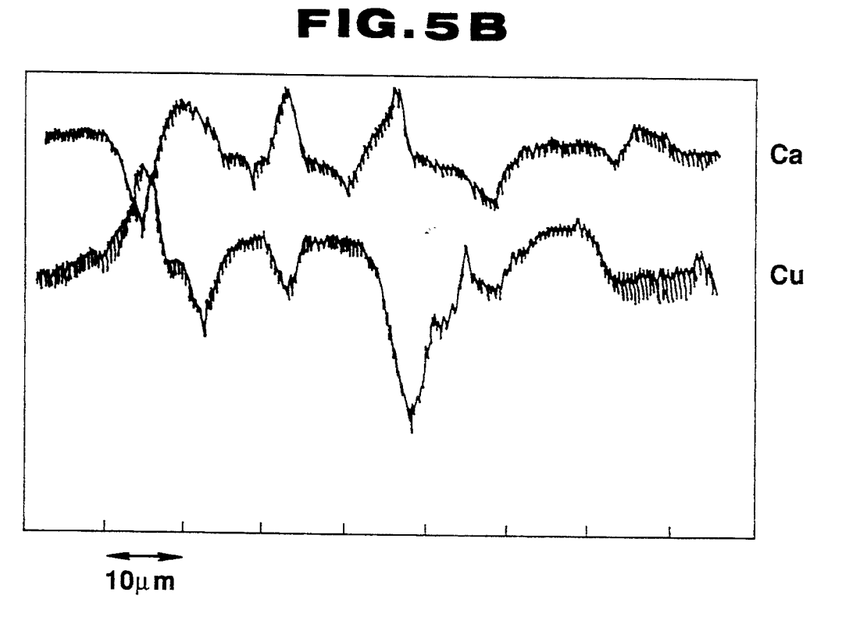
FIG. 5B is a graph similar to FIG. 2B but showing the EPMA analysis result for Ca and Cu of the compound oxide obtained by Comparative Example 2.
Figure 6:
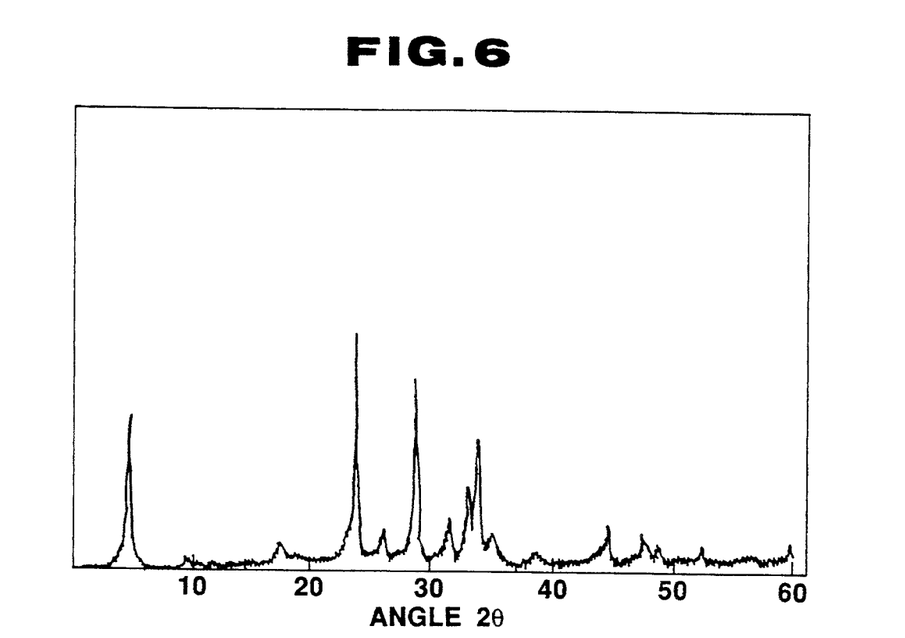
FIGS. 6 to 14 are graphs showing the results of an X-ray diffraction analysis of the compound oxides obtained by Examples 1, 2, 3, 4, 5, 6, 7, 8 and 9 and Comparative Examples 1, 2 and 3, respectively.
Figure 7:
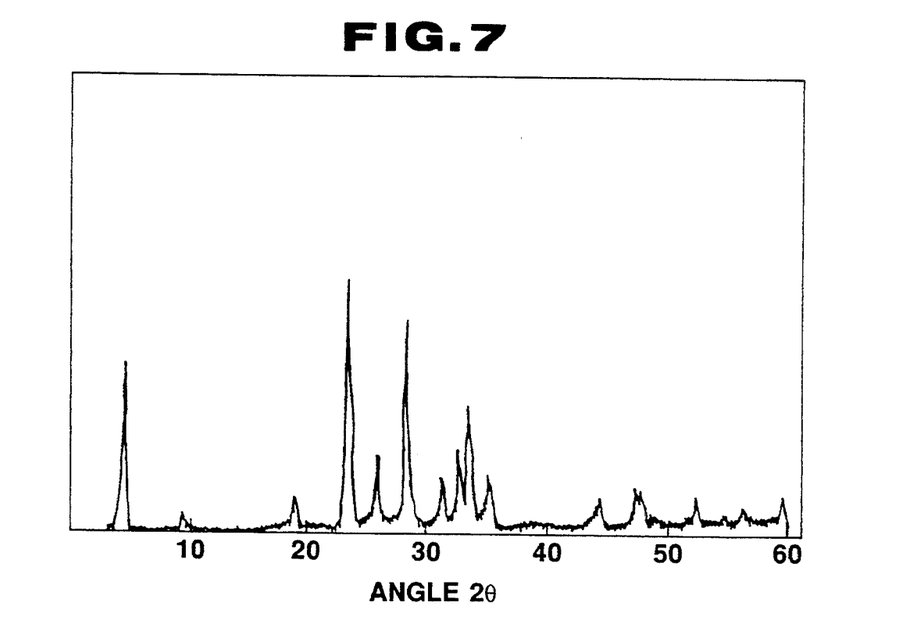
Figure 8:
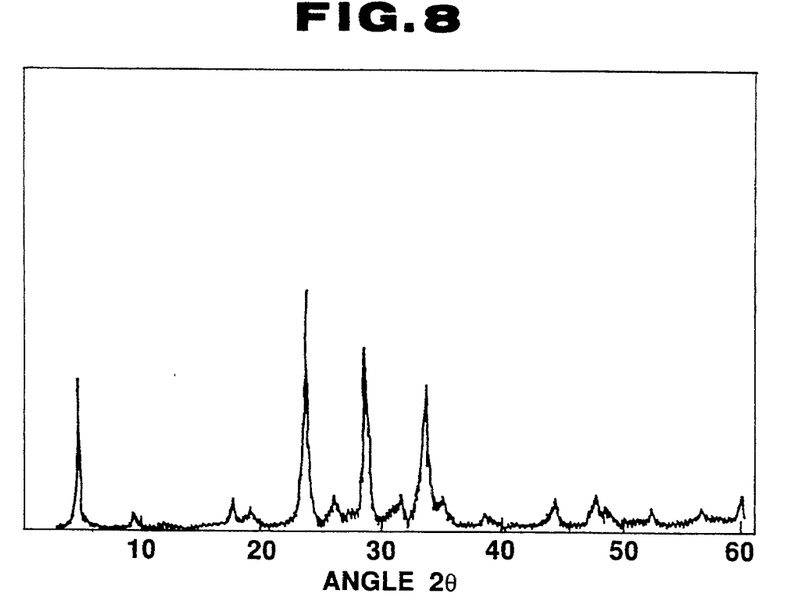
Figure 9:
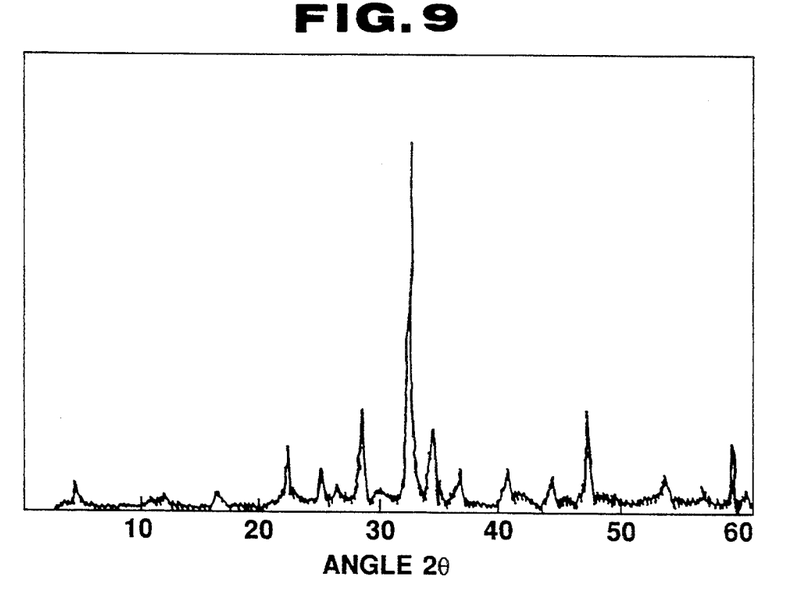
Figure 10:
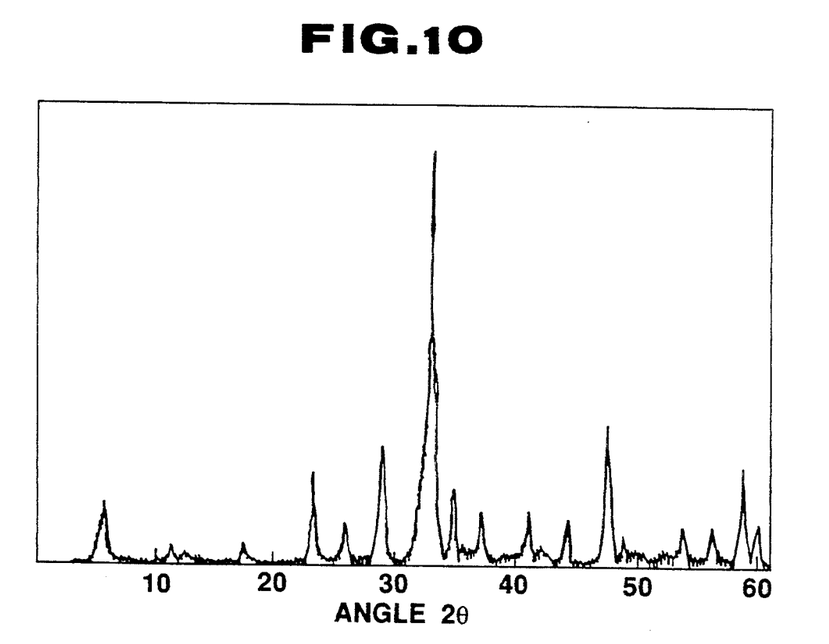
Figure 11:
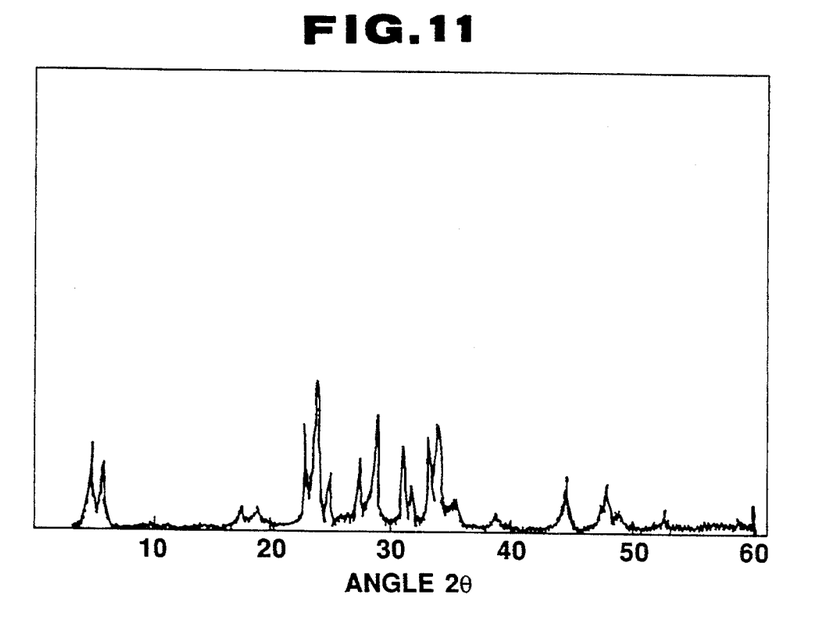
Figure 12:
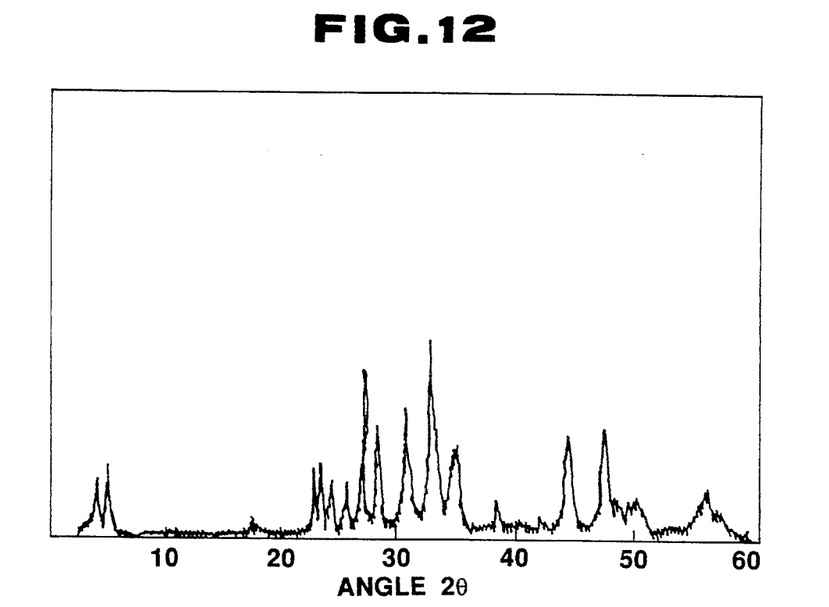
Figure 13:
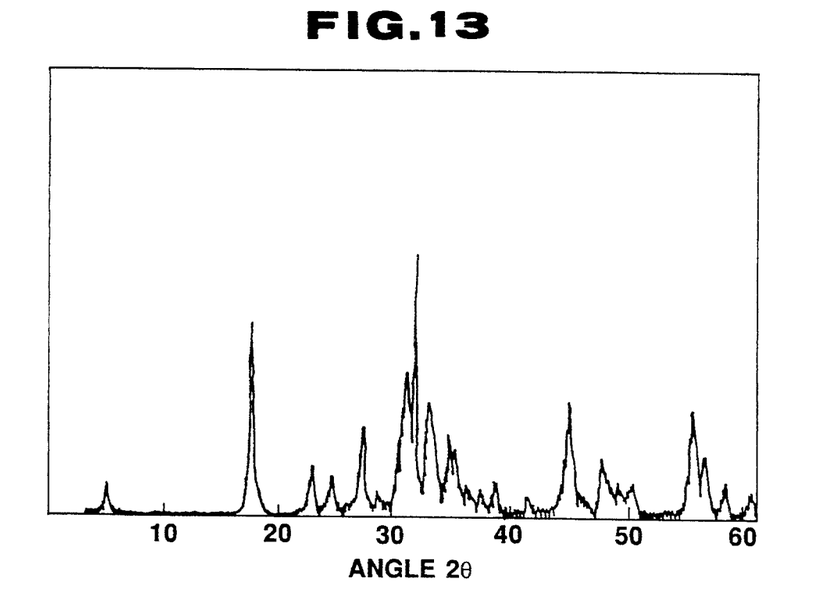
Figure 14:
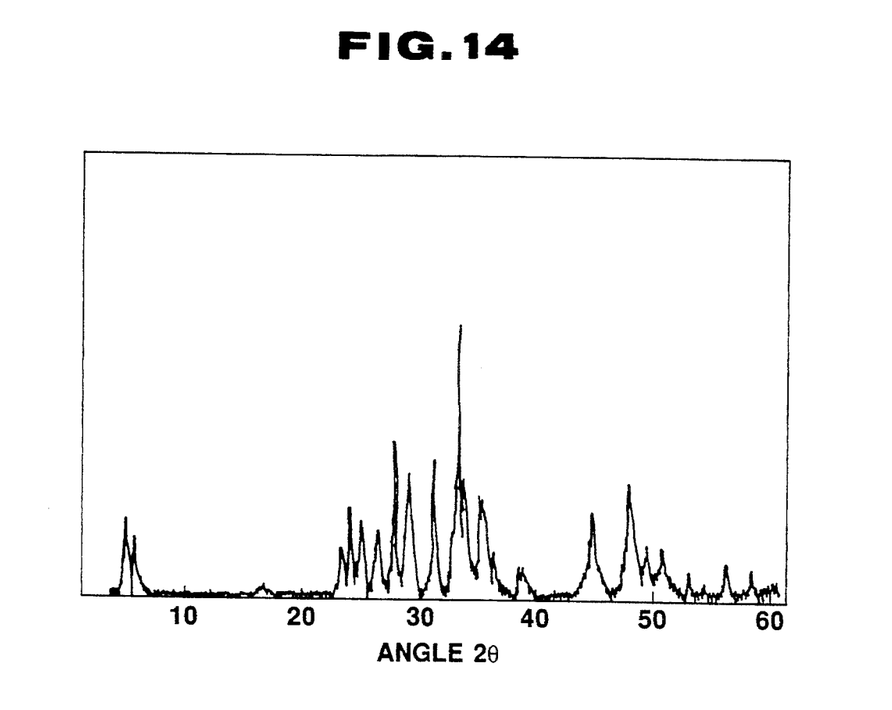

Transition temperature $T_c$ and magnetic susceptibility were measured for the compound oxide pellets obtained by Examples 1 to 6 (Sample Nos. 1 to 6) and Comparative Examples 1 to 3 (Sample Nos. 7 to 9). The measured transition temperature $T_c$ is shown in Table 1 and in FIG. 1 illustrating the relationship between the measured temperature (K) and resistivity (m.ohm.cm). The measured magnetic susceptibility ($X1/4\pi emu/cm^3$) is shown in Table 1.

Next, an EMPA analysis was conducted on the compound oxide pellet (Sample Nos. 1, 2, 7 and 8) of Bi—Pb—Sr—Ca—Cu—O system prepared in Examples 1 and 2 and Comparative Examples 1 and 2. The results of this analysis are shown in FIGS. 2A to 5B. More specifically, the analysis results (for Bi, Pb and Sr) of the Sample Nos. 1, 2, 7 and 8 are shown respectively in FIGS. 2A, 3A, 4A and 5A, while the same results (for Ca and Cu) of the Sample Nos. 1, 2, 7 and 8 are shown in FIGS. 2B, 3B, 4B and 5B.

Subsequently, an X-ray diffraction analysis was conducted on the compound oxide pellets (Sample Nos. 1 to 9). The results of the analysis are shown in FIG. 6 to 14, in which FIGS. 6, 7, 8, 9, 10, 11, 12, 13 and 14 respectively correspond to the Sample Nos. 1, 2, 3, 4, 5, 6, 7, 8 and 9 (respectively corresponding to Examples 1, 2, 3, 4, 5 and 6, and Comparative Examples 1, 2 and 3).

TABLE 1

| Item | Sample No. | $T_c$ (K) | Magnetic susceptibility ($\times \frac{1}{4}\pi$ emu/cm$^3$) |
|---|---|---|---|
| Example 1 | 1 | 108 | −0.91 |
| Example 2 | 2 | 110 | −0.93 |
| Example 3 | 3 | 110 | −0.93 |
| Example 4 | 4 | 120 | −0.90 |
| Example 5 | 5 | 123 | −0.90 |
| Example 6 | 6 | 105 | −0.85 |
| Comparative Example 1 | 7 | 103 | −0.78 |
| Comparative Example 2 | 8 | <77 | 0 |
| Comparative Example 3 | 9 | 103 | −0.69 |

What is claimed is:

1. A method of producing a compound oxide of selected elements including:
   at least one element selected from the group consisting of thallium, bismuth, lead, antimony, yttrium, and other rare earth elements,
   at least one transition metal element; and
   at least one element selected from the group consisting of the alkali metal elements and the alkaline earth metal elements, said method comprising the following steps in the sequence set forth:
   reacting at least one starting compound with an amount of citric acid that is from 25 to 50% by weight of the weight equivalent amount required for forming a citrate derivative of said selected elements, thereby forming a partly citrated compound,
   said starting compound comprising a mixture of derivatives of each of said selected elements or a co-precipitate of derivatives of each of said selected elements,
   said derivative of each of said selected elements being selected from the group consisting of carbonate, basic carbonate, and hydroxide,
   and said co-precipitate of derivatives of each of said selected elements is selected from the group consisting of carbonate, basic carbonate and hydroxide,
   and calcining said partly citrated compound.

2. A method as claimed in claim 1, wherein said amount of citric acid is within 30% to 50% of said weight equivalent amount required for forming completely citrated derivatives of said selected elements.

3. A method as claimed in claim 1, wherein said starting compound is reacted with said citric acid at a temperature ranging from 40° C. to 120° C.

4. A method as claimed in claim 3, wherein said starting compound is reacted with said citric acid at a temperature within a range of 75° C. to about 85° C.

5. A method as claimed in claim 1, further comprising the step of drying said partly citrated compound at a temperature ranging from 50° C. to 130° C., before calcining said partly citrated compound.

6. A method as claimed in claim 5, wherein said temperature is in a range of 105° C. to about 115° C.

7. A method as claimed in claim 1, wherein calcining said partly citrated compound includes preliminarily calcining at a temperature ranging from 800° C. to 900° C. for a time not less than 4 hours.

8. A method as claimed in claim 7, wherein calcining said partly citrated compound further includes calcining at a temperature ranging from 850° C. to 1000° C. for a time not less than 30 hours.

9. A method as claimed in claim 1, wherein at least one element is selected from said other rare earth elements and said other rare earth elements constitute the group consisting of lanthanum, neodymium, gadolinium, holmium, and erbium.

10. A method as claimed in claim 1, wherein each of the transition metal elements is one selected from the group consisting of copper, nickel, cobalt, manganese and iron.

11. A method as claimed in claim 1, wherein each of the alkali metal elements is one selected from the group consisting of potassium and sodium.

12. A method as claimed in claim 1, wherein each of the alkaline earth metal elements is one selected from the group consisting of barium, strontium, calcium and magnesium.

13. A method as claimed in claim 1, wherein selected elements include:
   at least two selected from the group consisting of thallium, bismuth, lead, antimony, yttrium, and other rare earth elements,
   at least two transition metal elements, and
   at least two element selected from the group consisting of the alkali metal elements and the alkaline earth metal elements.

* * * * *